United States Patent
Byeon et al.

(10) Patent No.: US 12,079,446 B2
(45) Date of Patent: Sep. 3, 2024

(54) DISPLAY DEVICE AND CONTROL METHOD THEREFOR

(71) Applicant: Samsung Electronics Co., Ltd., Suwon-si (KR)

(72) Inventors: Na Yeong Byeon, Suwon-si (KR); Jun Hwang, Suwon-si (KR); Eu Moon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 17/289,084

(22) PCT Filed: Oct. 23, 2019

(86) PCT No.: PCT/KR2019/013985
§ 371 (c)(1),
(2) Date: Apr. 27, 2021

(87) PCT Pub. No.: WO2020/091297
PCT Pub. Date: May 7, 2020

(65) Prior Publication Data
US 2022/0011910 A1    Jan. 13, 2022

(30) Foreign Application Priority Data
Nov. 2, 2018 (KR) .......................... 10-2018-0133619

(51) Int. Cl.
*G06F 3/0482* (2013.01)
*F24F 11/52* (2018.01)
(Continued)

(52) U.S. Cl.
CPC ............ *G06F 3/0482* (2013.01); *F24F 11/52* (2018.01); *G06F 3/0484* (2013.01); *G06F 9/454* (2018.02)

(58) Field of Classification Search
CPC ...... G06F 3/0482; G06F 3/0484; G06F 9/454; G06F 9/451; F24F 11/52; F24F 11/523
See application file for complete search history.

(56) References Cited

U.S. PATENT DOCUMENTS 9,797,616 B2    10/2017 Furuta et al.
10,025,460 B1 *  7/2018 Almand ............... G06F 3/0482
10,229,652 B2    3/2019 Jeon
(Continued)

FOREIGN PATENT DOCUMENTS

JP          6328621 B2     5/2018
JP       2018-169101 A    11/2018
(Continued)

OTHER PUBLICATIONS

Korean Office Action dated Jun. 5, 2023, issued in a Korean Patent Application No. 10-2018-0133619.

*Primary Examiner* — Michael Roswell
(74) *Attorney, Agent, or Firm* — Jefferson IP Law, LLP

(57) ABSTRACT

A display device according to one embodiment of the present invention comprises an input unit, a storage unit, a display unit for displaying a menu for providing at least one function, and a control unit, which generates a user pattern, including function information corresponding to an execution command and information about the time at which the execution command was received, when receiving the execution command from a user, controls the storage unit so as to store the generated user pattern, reconfigures the menu on the basis of the user pattern, and controls the display unit so as to display the reconfigured menu.

20 Claims, 8 Drawing Sheets

(51) Int. Cl.
*G06F 3/0484* (2022.01)
*G06F 9/451* (2018.01)

(56) References Cited

U.S. PATENT DOCUMENTS

| | | | | |
|---|---|---|---|---|
| 2006/0247915 | A1* | 11/2006 | Bradford | G06F 40/274 |
| | | | | 704/275 |
| 2008/0189614 | A1* | 8/2008 | Jeong | G06F 3/0482 |
| | | | | 715/767 |
| 2011/0016425 | A1* | 1/2011 | Homburg | G06F 3/0482 |
| | | | | 715/811 |
| 2013/0311946 | A1* | 11/2013 | Kwon | G06F 3/04817 |
| | | | | 715/811 |
| 2014/0035928 | A1* | 2/2014 | Ohgake | G06F 9/454 |
| | | | | 345/467 |
| 2015/0330817 | A1* | 11/2015 | Law | G16Z 99/00 |
| | | | | 702/19 |
| 2016/0025369 | A1 | 1/2016 | Lim et al. | |
| 2016/0066011 | A1* | 3/2016 | Ro | H04M 1/72415 |
| | | | | 725/38 |
| 2018/0295421 | A1* | 10/2018 | Lim | H04N 21/472 |

FOREIGN PATENT DOCUMENTS

| | | |
|---|---|---|
| KR | 10-2001-0086067 A | 9/2001 |
| KR | 10-2005-0025220 A | 3/2005 |
| KR | 10-2009-0080745 A | 7/2009 |
| KR | 10-2014-0071510 A | 6/2014 |
| KR | 10-2016-0012795 A | 2/2016 |
| KR | 10-2016-0021509 A | 2/2016 |
| KR | 10-2016-0116976 A | 10/2016 |
| KR | 10-1671633 B1 | 11/2016 |
| KR | 10-2017-0075269 A | 4/2017 |
| KR | 10-1801609 B1 | 11/2017 |
| WO | 2016/175356 A1 | 11/2016 |

* cited by examiner

FIG. 5

| OUTDOOR TEMPERATURE (To,℃) | INDOOR TEMPERATURE (Ti,℃) | WEATHER | YELLOW DUST LEVEL | RECOMMENDED OPERATION MODE |
|---|---|---|---|---|
| To<15 | Ti>24 | CLOUDY, RAINY, SNOWY | YELLOW DUST ALERT | PURIFICATION |
| | | | YELLOW DUST CAUTION | PURIFICATION |
| | | | - | PURIFICATION |
| | Ti≥24 | CLOUDY, RAINY, SNOWY | YELLOW DUST ALERT | DEHUMIDIFICATION + PURIFICATION |
| | | | YELLOW DUST CAUTION | DEHUMIDIFICATION + PURIFICATION |
| | | | - | DEHUMIDIFICATION |
| To≥15 | Ti<24 | CLOUDY, RAINY | YELLOW DUST ALERT | DEHUMIDIFICATION + PURIFICATION |
| | | | YELLOW DUST CAUTION | DEHUMIDIFICATION + PURIFICATION |
| | | | - | DEHUMIDIFICATION |
| | Ti≥24 | CLOUDY, RAINY | YELLOW DUST ALERT | COOLING + PURIFICATION |
| | | | YELLOW DUST CAUTION | COOLING + PURIFICATION |
| | | | - | COOLING |

DISPLAY DEVICE AND CONTROL METHOD THEREFOR

TECHNICAL FIELD

The disclosure relates to a display device and method of controlling the same, capable of receiving an execution command of a user.

BACKGROUND ART

With the development of conditioning technologies and the diversification of user demands for pleasant surroundings, modern air conditioners may provide not only basic functions such as cooling, heating, dehumidification, etc., but also additional functions to satisfy the various user demands.

Meanwhile, as the functions of air conditioners have been increasingly subdivided, there is a limit to showing all the functions at a time. This may make the user feel uncomfortable with the various functions provided, because the user has to go through several stages to input a command for a certain function or go through a complicated procedure to obtain information about the certain function.

DISCLOSURE

Technical Problem

An aspect provides a display device and method of controlling the display device capable of displaying menus for receiving an execution command of the user.

Technical Solution

As a technical means to attain the technical objective, a display device according to an aspect includes a user interface; a storage; a display displaying a menu for providing at least one function; and a controller configured to, upon reception of an execution command from a user, generate a user pattern including information about a function corresponding to the execution command and information about a time at which the execution command is received, control the storage to store the generated user pattern, reconfigure the menu based on the user pattern, and control the display to display the reconfigured menu.

The controller may determine a frequency of use of at least one function for each hour based on the user pattern, and reconfigure the menu based on the determined frequency of use for each hour.

The display device may further include a transceiver communicating with an external device, and the controller may determine a function to be displayed for the user based on time information received from the external device and the frequency of use for each hour and reconfigure the menu to preferentially display a menu for providing the determined function.

The controller may determine a function to be displayed for the user based on a predetermined period and reconfigure the menu to preferentially display a menu for providing the determined function.

The controller may reconfigure at least one of order, feature, shape, color, position, or size of the menu based on the user pattern.

The information about the function may include a type of the function and a setting value of the function.

The controller may, upon reception of identification information for user identification from the user, match the identification information with the generated user pattern, and control the storage to store the user pattern matched with the identification information.

The display device may further include a transceiver receiving location information from an external device, and the controller may determine a language in which to display the menu based on the location information and display the menu in the determined language.

The transceiver may receive at least one of weather information or environment information, and the controller may determine a recommended operation mode based on at least one of the weather information or the environment information, and control the display to display a menu for providing a function corresponding to the determined recommended operation mode.

The controller may control the display to display a menu for providing the at least one function in at least one form of an image or text.

In another aspect, a method of controlling a display device may include receiving an execution command from a user; generating a user pattern including information about a function corresponding to the execution command and information about a time at which the execution command is received; storing the generated user pattern; reconfiguring menu based on the user pattern; and displaying the reconfigured menu.

The reconfiguring of the menu based on the user pattern may include determining a frequency of use of at least one function for each hour based on the user pattern; and reconfiguring the menu based on the determined frequency of use for each hour.

The method may further include receiving time information from an external device, and the reconfiguring of the menu based on the user pattern may include determining a function to be displayed for the user based on the time information and the frequency of use for each hour; and reconfiguring the menu to preferentially display a menu for providing the determined function.

The reconfiguring of the menu based on the user pattern may include determining a function to be displayed for the user based on a predetermined period.

The reconfiguring of the menu based on the user pattern may include reconfiguring at least one of order, feature, shape, color, position, or size of the menu based on the user pattern.

The method may further include receiving identification information for user identification from the user, and the storing of the generated user pattern may further include matching the identification information with the generated user pattern; and storing the user pattern matched with the identification information.

The method may further include receiving location information; determining a language in which to display the menu based on the location information; and displaying the menu in the determined language.

The method may further include receiving at least one of weather information or environment information; determining a recommended operation mode based on the at least one of the weather information or the environment information; and displaying a menu for providing a function corresponding to the determined recommended operation mode.

The displaying of the reconfigured menu may include displaying a menu for providing the at least one function in at least one form of an image or text.

Advantageous Effects

According to an aspect, a display device and method of controlling the same may provide a reconfigured menu that takes into account preferences of individual users, thereby increasing convenience for the user. It may also configure a different screen depending on the user, thereby increasing the user's satisfaction.

DESCRIPTION OF DRAWINGS

FIG. 5 is a diagram for describing an operation of a display device to determine a recommended operation mode, according to an embodiment of the disclosure.

MODES OF THE INVENTION

Figure 1:
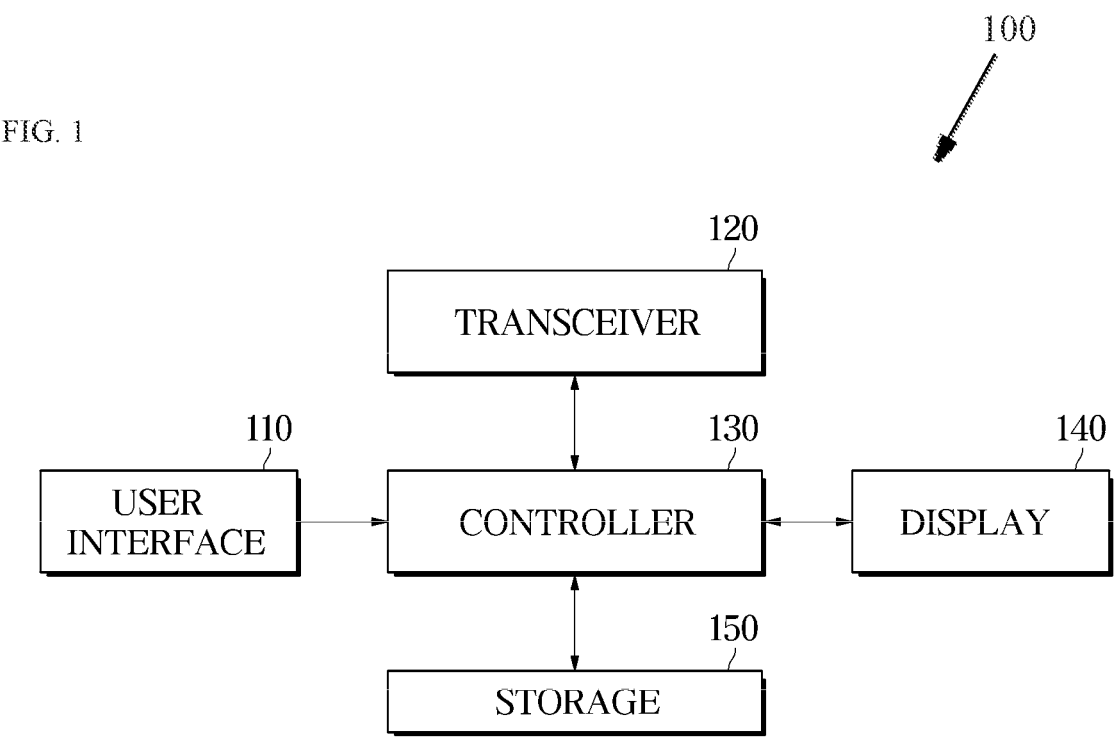
FIG. 1 is a control block diagram of a display device, according to an embodiment of the disclosure.

Like numerals refer to like elements throughout the specification. Not all elements of embodiments of the disclosure will be described, and description of what are commonly known in the art or what overlap each other in the embodiments will be omitted. The term 'unit, module, member, or block' may refer to what is implemented in software or hardware, and a plurality of units, modules, members, or blocks may be integrated in one component or the unit, module, member, or block may include a plurality of components, depending on the embodiment of the disclosure.

It will be further understood that the term "connect" or its derivatives refer both to direct and indirect connection, and the indirect connection includes a connection over a wireless communication network.

The terms "include" (or "including") or "comprise" (or "comprising") are inclusive or open-ended and do not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the present invention will now be described with reference to accompanying drawings.

FIG. 1 is a control block diagram of a display device, according to an embodiment of the disclosure.

Referring to FIG. 1, a display device 100 according to an embodiment includes a user interface 110, a transceiver 120, a display 140, a storage 150, and a controller 130.

The user interface 110 may receive an execution command from the user to provide at least one function for an external device. In particular, the user interface 110 may receive an execution command from the user for providing at least one function for an air conditioner.

Furthermore, the user interface 110 may receive, from the user, a turn-on command for the display device 100 or identification information for user identification.

For this, the user interface 110 may include a hardware device for user input, such as many different buttons or switches, a pedal, a keyboard, a mouse, a track ball, various levers, a handle, a stick, or the like.

Alternatively, the user interface 110 may include a graphical user interface (GUI) such as a touch pad, i.e., a software device, for user input. The touch pad may be implemented with a touch screen panel (TSP), thus forming an interlayer structure with the display 140.

The display 140 may display menus for providing at least one function that may be performed by the display device 100 or the external device. The menus for providing at least one function may include a high-level menu for providing a certain function and subordinate menus for providing subordinate functions for the certain function.

Specifically, the display 140 may display menus for providing the certain function in stages, and the user may input an execution command for the certain function by selecting at least one menu from among the menus displayed in stages.

Furthermore, the display 140 may provide various visual information relating to the external device for the user. The display 140 may display various information for an air conditioner in particular, e.g., weather information, room temperature information, status information of the air conditioner, etc.

For this, the display 140 may include a cathode ray tube (CRT), a digital light processing (DLP) panel, a plasma display panel (PDP), a liquid crystal display (LCD) panel, an electro luminescence (EL) panel, an electrophoretic display (EPD) panel, an electrochromic display (ECD) panel, a light emitting diode (LED) panel, an organic light emitting diode (OLED) panel, etc., but is not limited thereto.

The display 140 may also be used for the user interface 110 when implemented with the TSP that forms the interlayer structure with a touch pad.

The transceiver 120 may transmit or receive various kinds of information to or from the external device. The external device may include various devices such as a server, an air conditioner, a user equipment, etc.

The transceiver 120 may transmit control commands for various functions to the external device, and receive various information such as weather information, location information, environment information, operation information, etc., from the external device.

The environment information refers to information about a factor that affects indoor or outdoor environments. For example, the environment information may include information about a room temperature, an outdoor temperature, indoor humidity, outdoor humidity, indoor dust concentration, outdoor dust concentration, whether there is yellow dust, etc. It is not, however, limited thereto, and may include information about other factors that affect the indoor or outdoor environment.

The operation information may refer to information about an operation of the external device, and specifically, information about an operation of an air conditioner. The operation information may include information regarding all operations that may be set up in the air conditioner, including e.g., a set temperature, wind volume, wind direction, etc., along with an operation mode such as cooling, heating, dehumidification, purification, power saving, etc. It is not, however, limited thereto.

Besides, the transceiver 120 may receive at least one of time information and weather information.

For this, the transceiver 120 may include one or more components that enable communication with the external device, for example, at least one of a short-range transceiver, a wired transceiver, and a wireless transceiver.

The short-range transceiver may include various short range transceivers for transmitting and receiving signals within a short range over a wireless communication network, such as Bluetooth module, an infrared transceiver, a radio frequency identification (RFID) transceiver, a wireless local access network (WLAN) transceiver, a near field communication (NFC) module, a Zigbee transceiver, etc.

The wired transceiver may include not only one of various wired transceivers, such as a controller area network (CAN) transceiver, a local area network (LAN) module, a wide area network (WAN) module, or a value added network (VAN) module, but also one of various cable transceivers, such as a universal serial bus (USB), a high definition multimedia interface (HDMI), a digital visual interface (DVI), recommended standard (RS) 232, a power cable, or a plain old telephone service (POTS).

The wireless transceiver may include a wireless fidelity (WiFi) module, a wireless broadband (Wibro) module, and/or any wireless communication device for supporting various wireless communication schemes, such as a global system for mobile communication (GSM) module, a code division multiple access (CDMA) module, a wideband code division multiple access (WCDMA) module, a universal mobile telecommunications system (UMTS), a time division multiple access (TDMA) module, a long term evolution (LTE) module, etc.

The wireless transceiver may include a wireless communication interface with an antenna and transmitter for transmitting signals. Furthermore, the wireless transceiver may further include a signal conversion module for modulating a digital control signal output from the controller 130 through the wireless communication interface to an analog wireless signal under the control of the controller.

The wireless transceiver may also include a wireless communication interface with an antenna and receiver for receiving signals. Furthermore, the wireless transceiver may include a signal conversion module for demodulating an analog radio signal through the wireless communication interface into a digital control signal.

The controller 130 may perform overall control on the internal components of the display device 100.

The controller 130 may directly or indirectly control the external device by transmitting a control command to the external device.

The controller 130 may collect information about a function used by the user and generate a user pattern based on the collected information about the function. Specifically, upon receiving an execution command from the user, the controller 130 may generate a user pattern based on the information about a function corresponding to the execution command.

The user pattern refers to feature information relating to use of functions by the user. In other words, the user pattern may refer to information relating to common features of functions often used by the user.

The information about the function may include types of functions used by the user and setting values of the used functions, including a type and a setting value of a function that may be provided by an air conditioner. In this case, the types of functions may include various operation modes that may be provided by the air conditioner, such as cooling, heating, dehumidification, blowing, purification, power saving, etc., and the setting values of functions may include setting values for the respective operation modes.

The controller 130 may collect information about a function used by the user for each hour and generate a user pattern based on the information about the function used for each hour. For example, the controller 130 may generate the user pattern by matching the information about the function used by the user and information about a time at which the execution command to use the function is received. The time may include not only an hour but also a date.

The controller 130 may also generate a user pattern for each user. For example, the controller 130 may generate the user pattern for each user by matching identification information with the information about the function used by the user and the information about the time at which the execution command to use the function is received.

This user pattern may be stored in the storage 150 and used by the controller 130 to reconfigure menus to provide at least one function.

The controller 130 may store the generated user pattern, and reconfigure menus for providing at least one function based on the stored user pattern. Once the menus are reconfigured, the controller 130 may also control the display 140 to display the reconfigured menus.

For this, the controller 130 may determine a frequency of use of at least one function for each hour based on the user pattern, and reconfigure menus based on the determined frequency of use for each hour. This will be described later in detail.

The controller may be implemented with a memory (not shown) for storing an algorithm to control operation of the components of the display device 100 or data about a program that embodies the algorithm, and a processor (not shown) for carrying out the aforementioned operation using the data stored in the memory. The memory and the processor may be implemented in separate chips. Alternatively, the memory and the processor may be implemented in a single chip.

The storage 150 may store various kinds of information relating to the display device 100. Furthermore, the storage 150 may store various kinds of information received from the transceiver 120.

The storage 150 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as a random access memory (RAM), or a storage medium, such as hard disk drive (HDD) or compact disk (CD) ROM, without being limited thereto. The storage 150 may be a memory implemented with a chip separate from the aforementioned processor in relation to the controller 130, or may be implemented integrally with the processor in a single chip.

The display device 100 according to an embodiment may be implemented to be included in an air conditioner, user equipment, etc.

The user equipment may be implemented by a computer or a portable terminal that may access the display device 100 over a network. The computer may include e.g., a notebook, laptop, tablet personal computer (tablet PC), slate PC, etc., having a WEB browser installed therein, and the portable terminal may be a wireless communication device that guarantees portability and mobility, including any type of handheld based wireless communication device, such as a personal communication system (PCS), a global system for mobile communications (GSM), a personal digital cellular (PDC), a personal handphone system (PHS), a personal digital assistant (PDA), an international mobile telecommunication (IMT)-2000 device, a code division multiple access (CDMA)-2000 device, a W-CDMA device, a wireless broadband Internet (WiBro) terminal, a smart phone, etc., and a wearable device, such as a watch, a ring, a bracelet, a necklace, glasses, a contact lens, a head mounted device (HMD), etc.

At least one component may be added or omitted to correspond to the performance of the components of the display device 100 shown in FIG. 1. Furthermore, it will be obvious to those of ordinary skill in the art that the relative positions of the components may be changed to correspond to the system performance or structure.

The components shown in FIG. 1 may refer to software and/or hardware components such as field programmable gate arrays (FPGAs) and application specific integrated circuits (ASICs).

Operation of the display device 100 according to an embodiment will now be described in connection with FIGS. 2 to 6.

Figure 2:
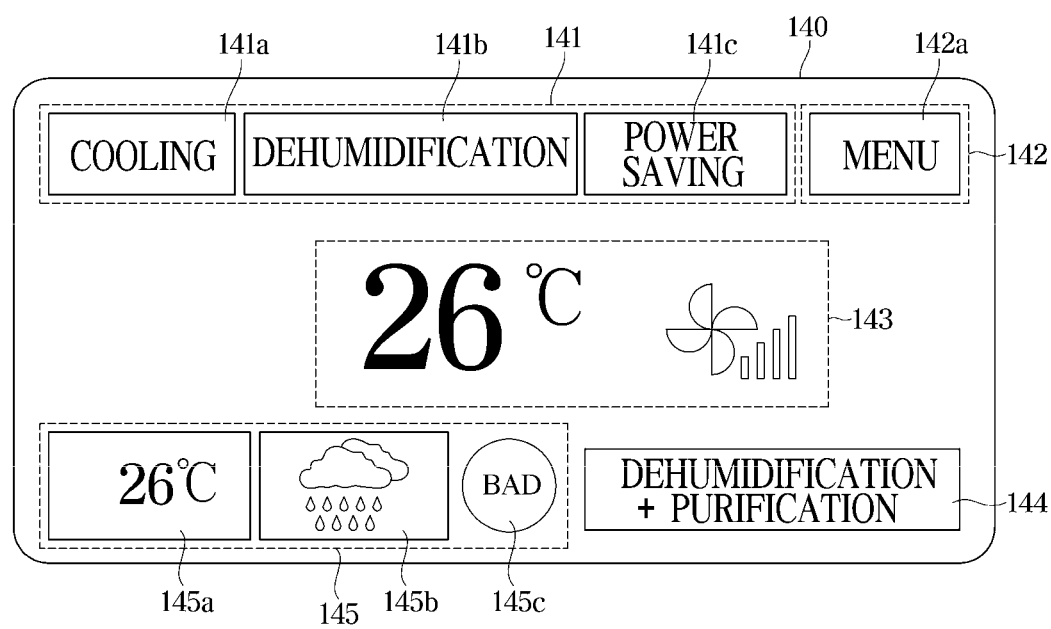
FIG. 2 illustrates a screen of a display device, according to an embodiment of the disclosure.
Figure 3:
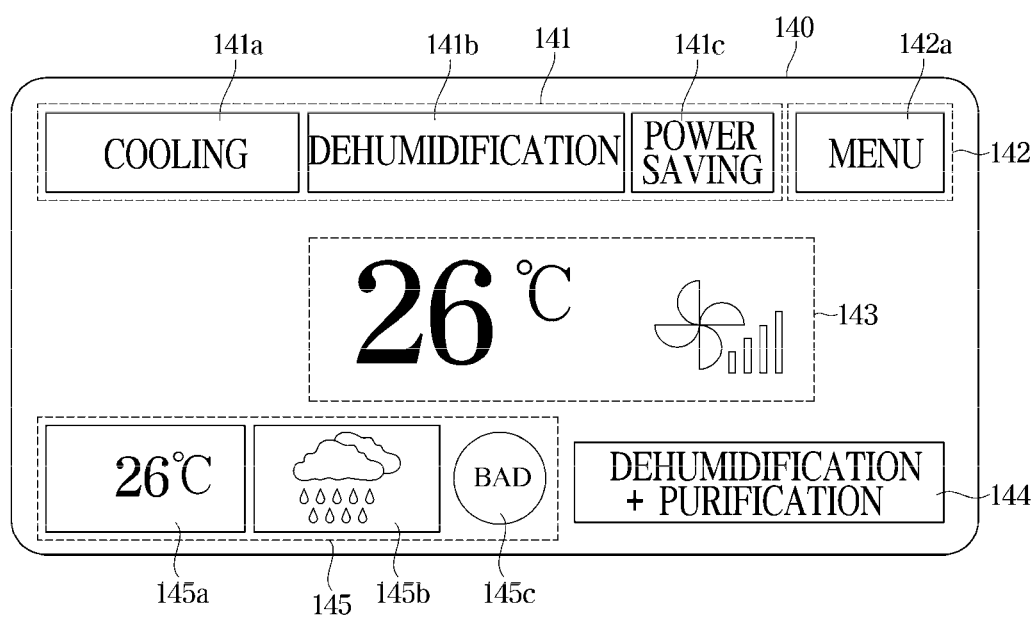
FIG. 3 illustrates a screen of a display device, according to an embodiment of the disclosure.
Figure 4:
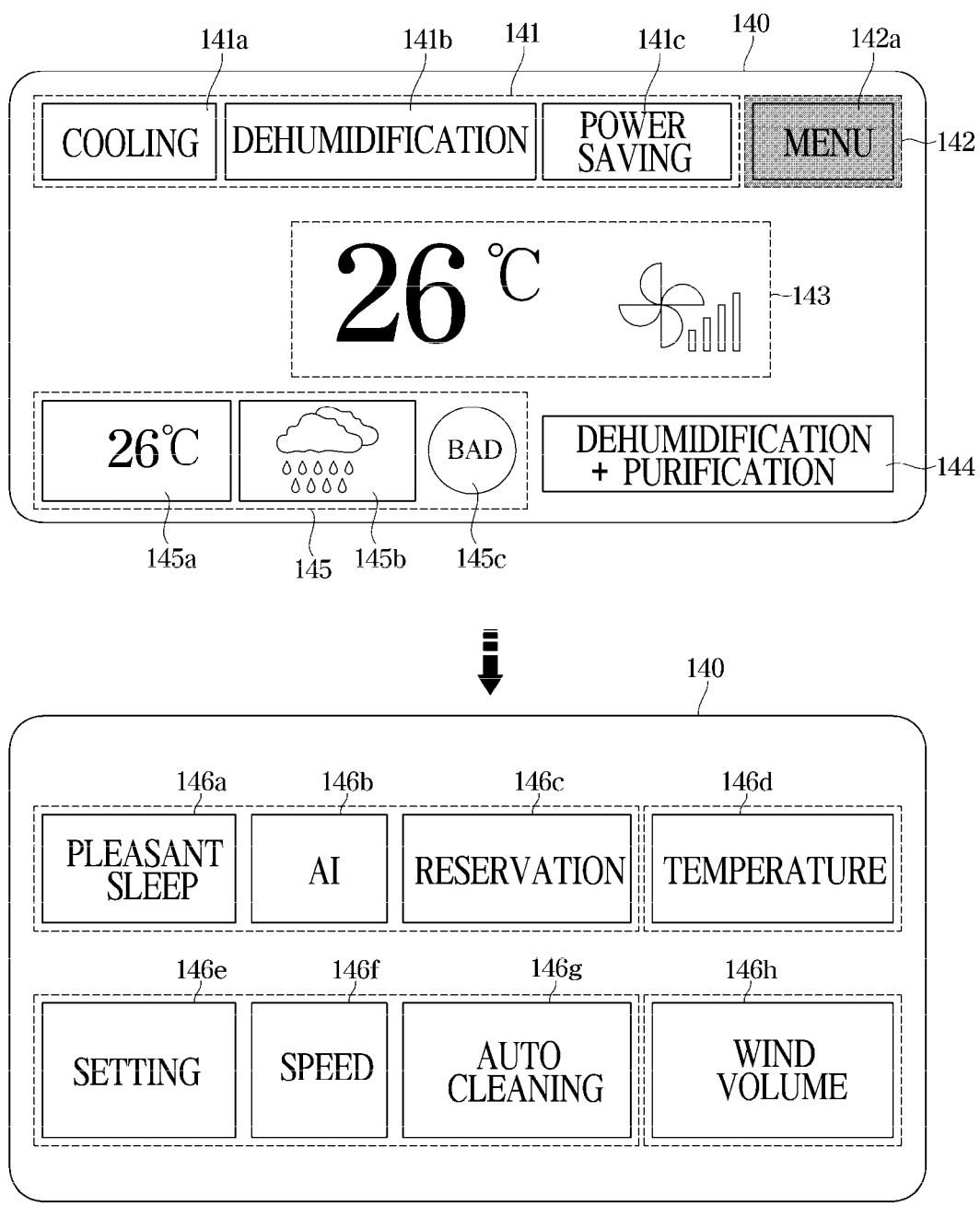
FIG. 4 is a diagram for describing an operation of a display device to reconfigure a screen, according to an embodiment of the disclosure.
Figure 6:
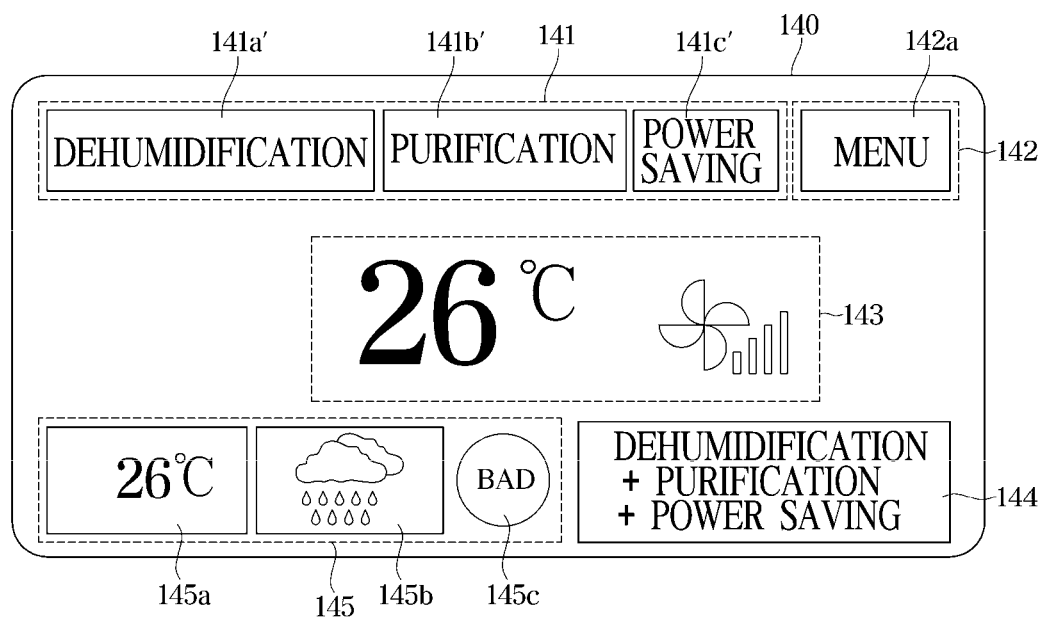
FIG. 6 illustrates a screen of a display device, according to an embodiment of the disclosure.

FIGS. 2, 3, and 6 illustrate screens of a display device, according to an embodiment of the disclosure, and FIG. 4 is a diagram for describing a screen reconfiguration operation of a display device, according to an embodiment of the disclosure. FIG. 5 is a diagram for describing an operation of a display device to determine a recommended operation mode, according to an embodiment of the disclosure.

Referring to FIG. 2, in an embodiment, the controller 130 may indicate menus 141a, 141b, 141c, 142a, 143, 145a, 145b, and 145c for providing at least one function. The menus for providing at least one function may include a menu for outputting information received from an external device.

The controller 130 may divide an area displayed by the display 140 into at least one of sections 141, 142, 143, 144, or 145, and determine menus to be displayed in the separate sections 141, 142, 143, 144, and 145.

For example, the controller 130 may display menus 141a, 141b, and 141c to indicate functions determined based on a user pattern in a first section 141, and display a menu 142a for providing a non-indicated function in a second section 142. The controller 130 may indicate a set temperature, status information of the air conditioner, etc., in a third section 143, indicate a recommended operation mode in a fourth section 144, and indicate information such as environment information received from the outside in a fifth section 145.

The controller 130 may control the display 140 to display the menus for providing the at least one function in at least one form of an image or text.

Upon reception of an execution command from the user, the controller 130 may generate a user pattern including information about a function corresponding to the execution command and information about a time at which the execution command is received.

Specifically, the controller 130 may generate the user pattern by matching information about the function corresponding to the execution command and information about the time at which the execution command is received. The information about the time may include not only an hour but also a date.

In this way, the controller 130 may collect information about a function used by the user for each hour and generate a user pattern indicating a feature of the function used by the user for each hour.

The controller 130 may also generate a user pattern for each user. For example, the controller 130 may generate the user pattern for each user by matching identification information with the information about the function used by the user and the information about the time at which the execution command to use the function is received.

The controller 130 may store the generated user pattern, and reconfigure menus for providing at least one function based on the stored user pattern. Once the menus are reconfigured, the controller 130 may also control the display 140 to display the reconfigured menus.

For this, the controller 130 may determine a frequency of use of at least one function for each hour based on the user pattern, and reconfigure menus based on the determined frequency of use for each hour.

Specifically, the controller 130 may determine a frequency of use of at least one function for each hour based on the information about the function used by the user for each hour, which is included in the user pattern. The controller 130 may determine a predetermined number of functions with high frequency of use for each hour as functions to be displayed for the user, and reconfigure menus to preferentially display the determined functions with high frequency of use for each hour.

In other words, the controller 130 may determine functions with high frequency of use at this time based on the user pattern, and reconfigure menus to preferentially display the functions.

For this, the controller 130 may receive information of time from an external device, and the information of time may include at least one of a current time and a current date.

Furthermore, the controller 130 may determine as many functions with high frequency of use at this time as the predetermined number, and may reconfigure at least one of order, feature, shape, color, position, or size of a menu corresponding to each of the functions in order of higher frequency of use.

For example, as shown in FIG. 3, when functions with high frequency of use at this time are determined to be cooling, dehumidification, and power saving, the controller 130 may reconfigure the order of menus corresponding to the respective functions to be in a sequence of cooling, dehumidification, and power saving, so that the menu 141a corresponding to the cooling function with the highest frequency of use at this time has top priority. Alternatively, the controller 130 may reconfigure menus so that the menu 141a corresponding to the cooling function with the highest frequency of use has the biggest size. In this case, the controller 130 may reconfigure menus so that the menu 141c corresponding to the power saving function with the lowest frequency of use has the smallest size.

Apart from the aforementioned example, the controller 130 may reconfigure at least one of the order, feature, shape, color, position, or size of a menu in many different manners based on the frequency of use for each hour included in the user pattern and display the reconfigured menu, thereby giving the user intuition. Accordingly, menus of functions frequently used for each hour may be easily provided for the user, increasing convenience for the user.

Furthermore, the controller 130 may determine a predetermined number of functions with high frequency of use for each hour as functions to be displayed for the user based on a predetermined period, and reconfigure menus to preferentially display the determined functions.

The controller 130 may reconfigure menus to preferentially display functions with high frequency of use for each hour based on the predetermined period and display the reconfigured menus, thereby providing menus that takes into account functions used by the user for each hour in real time.

Furthermore, upon reception of location information through the transceiver 120, the controller 130 may determine a language in which to display the menus based on the location information. The controller 130 may reconfigure menus in the determined language and display the reconfigured menus, thereby automatically providing the user with the menus in a suitable language without an extra input from the user. This may increase comfort of the user.

Furthermore, upon reception of an execution command for a certain menu, the controller 130 may display at least one subordinate menu for the certain menu. In this case, the controller 130 may reconfigure the at least one subordinate menu based on the user pattern and display the reconfigured menu.

The controller 130 may reconfigure at least one of order, feature, shape, color, position, or size of the subordinate menu based on the user pattern, and display the reconfigured menu.

For this, the controller 130 may determine a frequency of use of at least one subordinate function for each hour based on the user pattern, and reconfigure the menus for the subordinate functions based on the determined frequency of use. This is the same as what is described above.

In the meantime, upon reception of an execution command for a certain menu from the user, the controller 130 may emphasize the certain menu for which the execution command is received and display the emphasized certain menu. Specifically, the controller 130 may reconfigure at least one of color, size, feature, and shape of the certain menu selected by the user and display the reconfigured menu, thereby giving the user intuition into the selected menu. Accordingly, as the selected menu is emphasized and then displayed, the user may check out the selected menu with increased convenience.

Referring to FIG. 4, for example, the user may input an execution command for a separate menu 142*a*, which is the high-level menu to display all the functions, to use a function not displayed as the functions frequently used for each hour, i.e., a function other than the frequently used function.

The controller 130 may emphasize the menu 142*a* for which the execution command is input from the user, i.e., the menu 142*a* selected by the user, by displaying the menu 142*a* in a different color.

The controller 130 may display at least one subordinate menus 146*a*, 146*b*, 146*c*, 146*d*, 146*e*, 146*f*, 146*g* and 146*h* for the menu 142*a* selected by the user, and in this case, the controller 130 may reconfigure the subordinate menus 146*a*, 146*b*, 146*c*, 146*d*, 146*e*, 146*f*, 146*g* and 146*h* for the menu 142*a* based on the frequency of use for each hour in the user pattern. The controller 130 may reconfigure at least one of order, feature, shape, color, position, or size of the subordinate menus 146*a*, 146*b*, 146*c*, 146*d*, 146*e*, 146*f*, 146*g* and 146*h* based on the frequency of use for each hour, and display the reconfigured subordinate menu.

The subordinate menus are not, however, limited to the aforementioned example, but may include a function that may be provided by an external device connected to the display device 100.

Meanwhile, the controller 130 may determine a recommended operation mode based on information received from the external device.

Specifically, the controller 130 may determine the recommended operation mode based on at least one of location information, weather information, or environment information received through the transceiver 120. The recommended operation mode may refer to an operation mode estimated to be suitable for the user's surroundings.

The controller 130 may determine the recommended operation mode based on whether at least one of the location information, the environment information, or the weather information satisfies a predetermined condition.

For example, as shown in FIG. 5, the controller 130 may determine the recommended operation mode based on environment information and weather information including an outside temperature, a room temperature, whether there is yellow dust, etc.

However, the conditions illustrated in FIG. 5 are merely a simple example, and the conditions may be stored in the storage 150 or may be received from the external device through the transceiver 120.

When the recommended operation mode is determined, the controller 130 may control the display 140 to display menus for providing functions corresponding to the determined recommended operation mode.

For example, as shown in FIG. 6, when a dehumidification, purification and power saving operation mode is determined for the recommended operation mode, the controller 130 may display the recommended operation mode in the fourth section 144. Along with this, the controller 130 may also display menus of dehumidification 141*a'*, purification 141*b'* and power saving 141*c'* for providing functions corresponding to the dehumidification and purification mode.

Alternatively, the controller 130 may display initial menus for providing functions corresponding to the recommended operation mode before the user pattern is generated, and when the user pattern is generated, reconfigure the initial menus based on the user pattern. Accordingly, before a user pattern is generated, a recommended operation mode that is suitable for the location, weather, and surroundings of the user is provided, and after the user pattern is generated, menus reconfigured by taking into account individual user preferences may be displayed, thereby increasing convenience for the user.

Figure 7:
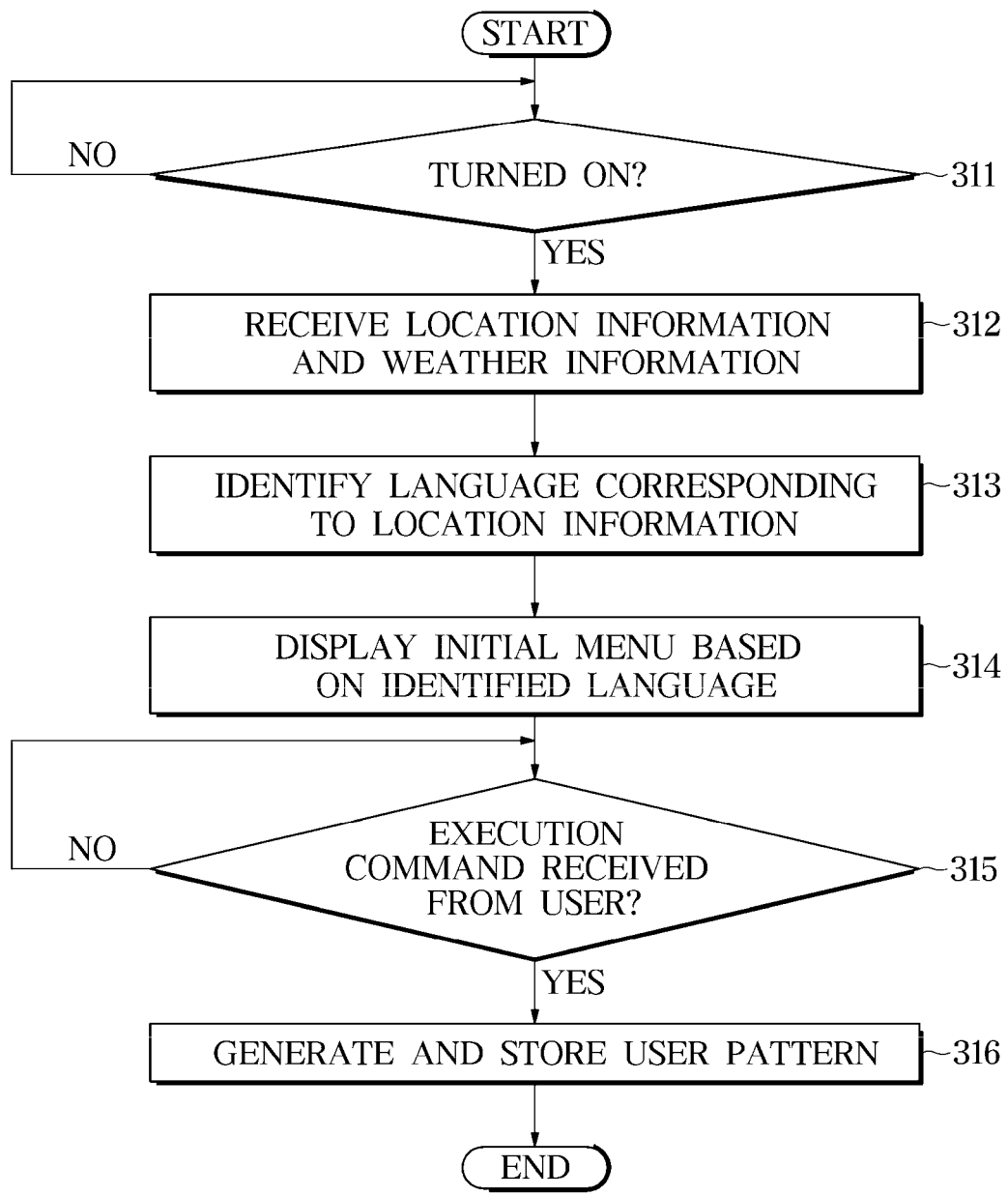
FIG. 7 is a flowchart of a control method for a display device, according to an embodiment of the disclosure.

FIG. 7 is a flowchart of a control method for a display device, according to an embodiment of the disclosure.

Referring to FIG. 7, the display device 100 according to an embodiment may determine whether it is turned on in 311, and when turned on (yes in 311), may receive location information and weather information from an external device in 312.

Upon reception of the location information and weather information, the display device 100 may identify a language corresponding to the location information, in 313. The display device 100 may identify a language estimated to be used by the user based on the location information.

Once the language corresponding to the location information is identified, the display device 100 may display initial menus based on the identified language, in 314. The initial menus may refer to menus displayed before a user pattern is generated, and the display device 100 may display menus for providing functions corresponding to a recommended operation mode for the initial menus.

For this, the display device 100 may determine the recommended operation mode based on whether at least one of the location information, environment information or the weather information satisfies a predetermined condition. The environment information refers to information about a factor that affects indoor or outdoor environments. For example, the environment information may include information about a room temperature, an outdoor temperature, indoor humidity, outdoor humidity, indoor dust concentration, outdoor dust concentration, whether there is yellow dust, etc. It is not, however, limited thereto, and may include information about other factors that affect the indoor or outdoor environment.

Subsequently, the display device 100 may determine whether an execution command is received from the user in 315, and when the execution command is received from the user (yes in 315), may generate and store a user pattern in 316.

The user pattern refers to feature information relating to use of functions by the user. In other words, the user pattern may refer to information relating to common features of functions often used by the user.

Specifically, the display device 100 may collect information about a function used by the user, i.e., information about a function corresponding to the execution command, and generate a user pattern based on the collected information about the function.

The information about the function may include types of functions used by the user and setting values of the used functions, including types and setting values of functions that may be provided by an air conditioner. In this case, the types of functions may include various operation modes that may be provided by the air conditioner, such as cooling, heating, dehumidification, blowing, purification, power saving, etc., and the setting values of functions may include setting values for the respective operation modes.

Furthermore, the display device 100 may collect information about a function used by the user for each hour and generate a user pattern based on the information of the function used for each hour. Specifically, the display device 100 may generate the user pattern by matching the information about the function used by the user and information about a time at which an execution command to use the function is received. The time may include not only an hour but also a date.

The display device 100 may also generate a user pattern for each user. For example, the display device 100 may generate the user pattern for each user by matching identification information with the information about the function used by the user and the information about a time at which the execution command to use the function is received.

The display device 100 may store the user pattern to learn the information about functions used by the user for each hour. Accordingly, menus that takes into account functions used by individual users may be learned.

Figure 8:
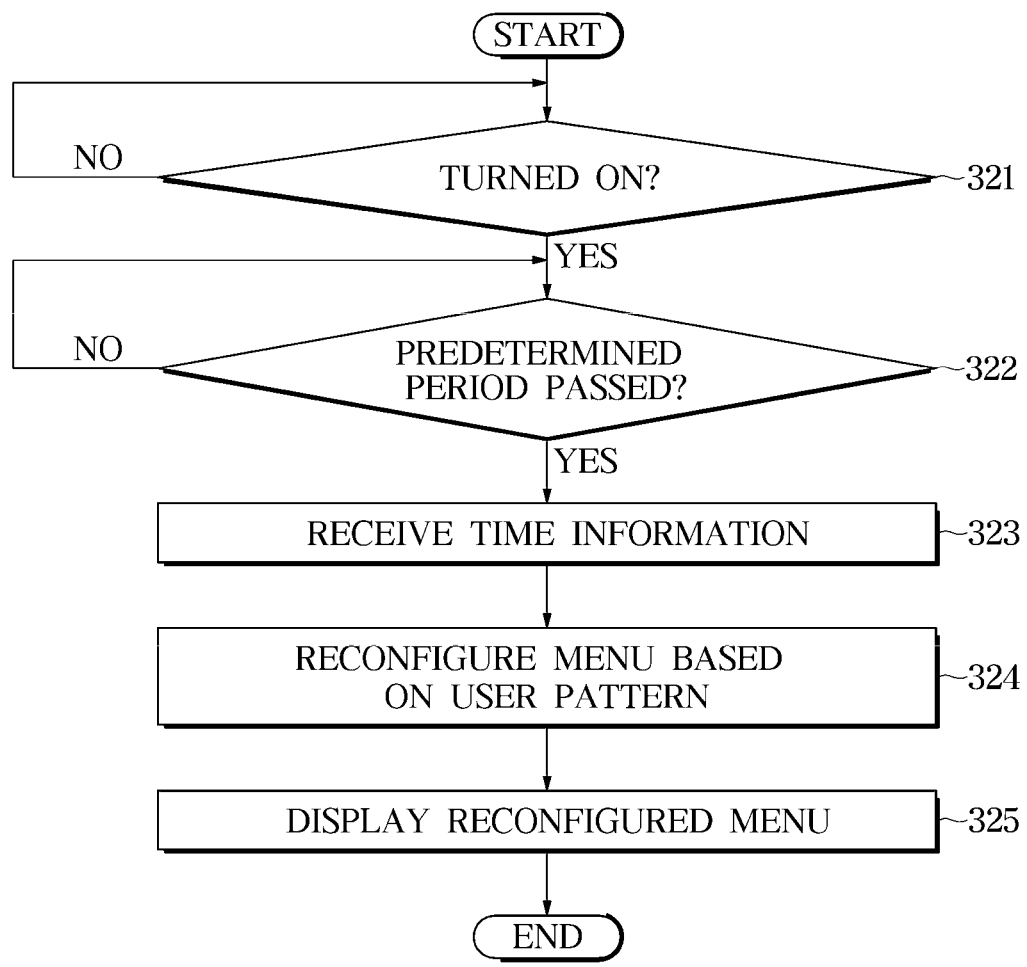
FIG. 8 is a flowchart of a control method for a display device, according to an embodiment of the disclosure.

FIG. 8 is a flowchart of a control method for a display device, according to an embodiment of the disclosure.

Referring to FIG. 8, the display device 100 according to an embodiment may determine whether it is turned on in 321, and when turned on (yes in 321), may determine whether a predetermined period has passed in 322.

When it is determined that the predetermined period has passed (yes in 322), the display device 100 may receive time information in 323. The time information may include at least one of the current hour and the current date, which may be received from an external device.

Upon receiving the time information, the display device 100 may reconfigure menus based on the user pattern, in 324. In this case, the display device 100 may reconfigure menus based on the user pattern stored in advance.

For this, the display device 100 may determine a frequency of use of at least one function for each hour based on the user pattern, and reconfigure menus based on the determined frequency of use for each hour.

Specifically, the display device 100 may determine a frequency of use of at least one function for each hour based on the information about the function used by the user for each hour, which is included in the user pattern. The display device 100 may determine a predetermined number of functions with high frequency of use for each hour as functions to be displayed for the user, and reconfigure menus to preferentially display the determined functions with high frequency of use for each hour.

In other words, the display device 100 may determine functions with high frequency of use at this time based on the user pattern, and reconfigure menus to preferentially display the functions.

Furthermore, the controller 130 may determine as many functions with high frequency of use at this time as the predetermined number, and may reconfigure at least one of order, feature, shape, color, position, or size of a menu corresponding to each of the functions in order of higher frequency of use.

Subsequently, the display device 100 may display the reconfigured menus, in 325.

The display device 100 may give the user intuition by displaying menus reconfigured based on the user pattern. Accordingly, menus of functions frequently used for each hour may be easily provided for the user, increasing convenience for the user.

In the meantime, the display device 100 may repeat steps 322 to 334 based on the predetermined period, so that menus that take into account functions used by the user for each hour may be provided for the user in real time without an extra input from the user. This may increase comfort of the user.

Meanwhile, the embodiments of the disclosure may be implemented in the form of a recording medium for storing instructions to be carried out by a computer. The instructions may be stored in the form of program codes, and when executed by a processor, may generate program modules to perform operation in the embodiments of the disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

The embodiments of the disclosure have thus far been described with reference to accompanying drawings. It will be obvious to people of ordinary skill in the art that the present disclosure may be practiced in other forms than the embodiments as described above without changing the technical idea or essential features of the present disclosure. The above embodiments are only by way of example, and should not be interpreted in a limited sense.

The invention claimed is:

1. A display device comprising:
a user interface;
a storage;
a display configured to display the user interface to include at least one menu providing at least one function of an external device;
a transceiver configured to receive at least one of weather information or environment information; and
at least one processor configured to:
in response to receiving, from a user, an execution command selecting a menu among the at least one menu, generate a user pattern including information about a function corresponding to the selected menu and time information about a time at which the execution command selecting the menu is received,
control the storage to store the user pattern,
based on the user pattern, reconfigure the menu,
control the display to display, in a first area of the user interface, a first menu determined based on the user pattern,
based on at least one of the weather information or the environment information, determine a recommended operation mode of the external device,
based on the determining of the recommended operation mode, control the display to display, on the reconfigured menu, a recommended function corresponding to the recommended operation mode of the external device,
control the display to display, in a second area of the user interface separate from the first area, a second menu providing functions not displayed in the first area, and
in response to receiving, from the user, an execution command selecting the second menu, reconfigure at least one subordinate menu for the second menu based on the user pattern and control the display to remove the first menu and the second menu from the user interface and display the reconfigured at least one subordinate menu for the second menu in at least the first area and the second area of the user interface.

2. The display device of claim 1, wherein the at least one processor is further configured to:
based on the user pattern, determine a frequency of use of the at least one function for each hour, and
based on the frequency of use of the at least one function for each hour, reconfigure the menu.

3. The display device of claim 2,
wherein the transceiver is further configured to communicate with the external device, and
wherein the at least one processor is further configured to:
based on the time information and the frequency of use of the at least one function for each hour, determine one function to be displayed for the user, and
reconfigure the menu to display one menu providing the one function in a preferential location of the user interface among locations of the at least one menu displayed on the user interface.

4. The display device of claim 3, wherein the at least one processor is further configured to:
based on a predetermined period, determine a predetermined period function to be displayed for the user, and
reconfigure the menu to display a predetermined period menu providing the predetermined period function.

5. The display device of claim 1, wherein the at least one processor is further configured to:
reconfigure the menu by reconfiguring at least one of an order, a feature, a shape, a color, a position, or a size of the menu based on the user pattern.

6. The display device of claim 1, wherein the information about the function includes a type of the function and a setting value of the function.

7. The display device of claim 1, wherein the at least one processor is further configured to:
in response to receiving identification information for user identification from the user, match the identification information with the user pattern, and
control the storage to store the user pattern matched with the identification information.

8. The display device of claim 1,
wherein the transceiver is further configured to receive location information from the external device, and
wherein the at least one processor is further configured to:
based on the location information, determine a language in which to display the menu, and
control the display to display the menu in the determined language.

9. The display device of claim 8, wherein the transceiver is further configured to receive operation information.

10. The display device of claim 9, wherein the operation information comprises information regarding operations available to be set up in the external device.

11. The display device of claim 10, wherein the operations available to be set up in the external device comprise at least one of a set temperature, a wind volume, or a wind direction.

12. The display device of claim 1, wherein the at least one processor is further configured to:
control the display to display the at least one menu providing the at least one function in a form of at least one of an image or text.

13. The display device of claim 1, wherein the external device comprises an air conditioner.

14. The display device of claim 1, wherein the recommended operation mode comprises at least one of cooling, heating, dehumidification, purification, or power saving.

15. A method of controlling a display device, the method comprising:
displaying a user interface including at least one menu providing at least one function of an external device;
receiving, by a transceiver of the display device, at least one of weather information or environment information;
receiving, from a user, an execution command selecting a menu among the at least one menu;
in response to receiving the execution command selecting the menu, generating a user pattern including information about a function corresponding to the selected menu and information about a time at which the execution command selecting the menu is received;
storing the user pattern;
based on the user pattern, reconfiguring the menu;
displaying, in a first area of the user interface, a first menu determined based on the user pattern;
based on at least one of the weather information or the environment information, determining a recommended operation mode of the external device;
based on the determining of the recommended operation mode, displaying, on the reconfigured menu, a recommended function corresponding to the recommended operation mode of the external device;
displaying, in a second area of the user interface separate from the first area, a second menu providing functions not displayed in the first area; and in response to receiving, from the user, an execution command selecting the second menu, reconfiguring at least one subordinate menu for the second menu based on the user pattern and displaying the reconfigured at least one subordinate menu for the second menu in at least the first area and the second area of the user interface after removing the first menu and the second menu from the user interface.

16. The method of claim 15, wherein the reconfiguring of the menu comprises:
based on the user pattern, determining a frequency of use of the at least one function for each hour; and
based on the frequency of use of the at least one function for each hour, reconfiguring the menu.

17. The method of claim 16, further comprising:
receiving time information from the external device,
wherein the reconfiguring of the menu further comprises:
based on the time information and the frequency of use of the at least one function for each hour, determining one function to be displayed for the user, and
reconfiguring the menu to display one menu providing the one function in a preferential location of the user interface among locations of the at least one menu displayed on the user interface.

18. The method of claim 15, wherein the reconfiguring of the menu comprises reconfiguring the menu by reconfiguring at least one of an order, a feature, a shape, a color, a position, or a size of the menu based on the user pattern.

19. The method of claim 15, further comprising:
receiving, from the user, identification information for user identification,
wherein the storing the user pattern comprises:
in response to receiving the identification information, matching the identification information with the user pattern, and
storing the user pattern matched with the identification information.

20. The method of claim 15, further comprising:
identifying a dust level; and
based on the dust level, recommending a purification operation mode.

* * * * *